M. E. BLOOD.
DRIVING GEAR.
APPLICATION FILED OCT. 15, 1913.
1,155,467.
Patented Oct. 5, 1915.
2 SHEETS—SHEET 2.
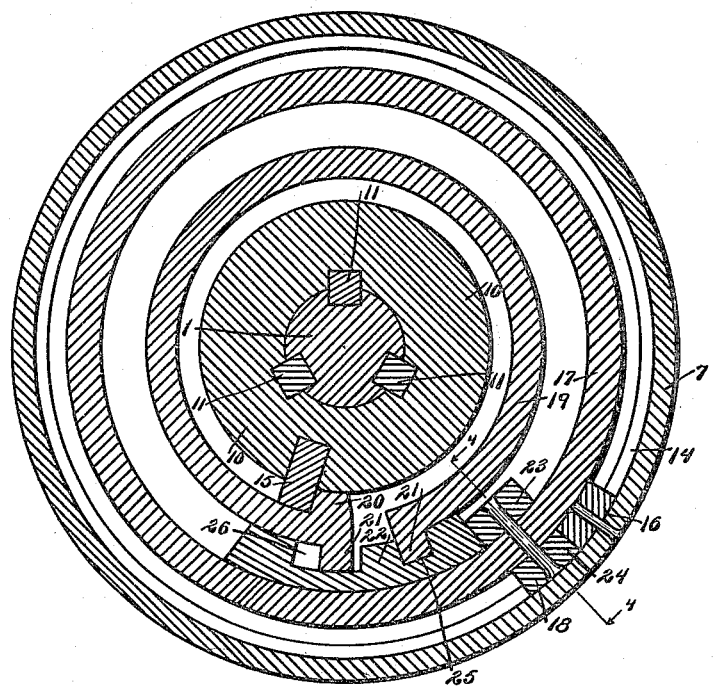
FIG. III.
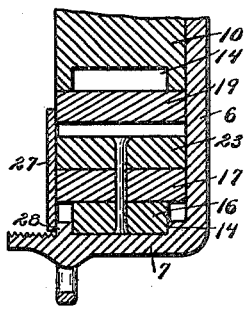
FIG. IV.
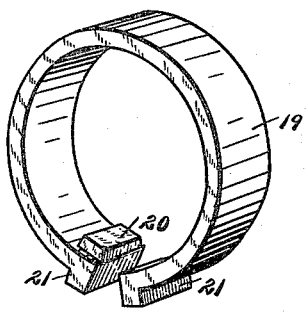
FIG. V.
Witnesses
M. L. Glasgow.
G. B. Thompson.
Inventor
Maurice E. Blood
By Chappell & Earl
Attorneys

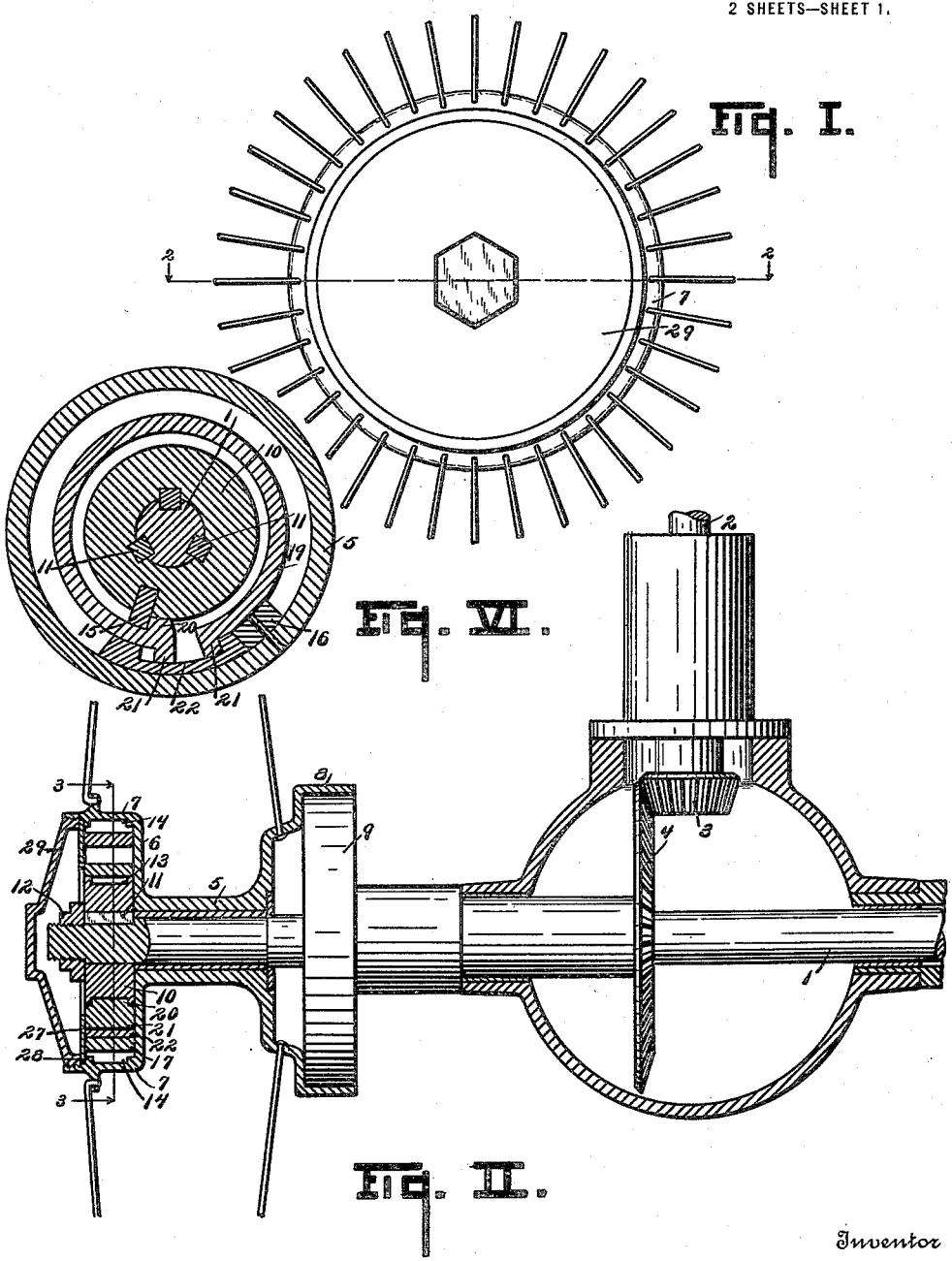

UNITED STATES PATENT OFFICE.

MAURICE E. BLOOD, OF KALAMAZOO, MICHIGAN.

DRIVING-GEAR.

1,155,467. Specification of Letters Patent. Patented Oct. 5, 1915.

Application filed October 15, 1913. Serial No. 795,219.

*To all whom it may concern:*

Be it known that I, MAURICE E. BLOOD, a citizen of the United States, residing at Kalamazoo, Michigan, have invented certain new and useful Improvements in Driving-Gears, of which the following is a specification.

This invention relates to improvements in driving gears.

My improvements relate particularly to driving gears for motor vehicles adapted to be embodied in the hubs of the driving or traction wheels, and especially, wheels for light motor vehicles of the type commonly designated as cycle cars.

The main objects of this invention are: First, to provide an improved driving gear for motor vehicles. Second, to provide an improved driving gear for motor vehicles adapted to be embodied in the hub of a wheel such as is commonly employed on motor vehicles of the cycle car type. Third, to provide an improved driving gear, embodying these advantages, which is simple and compact in structure, practically noiseless, and one which is very durable in use.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is an outside elevation of a wire wheel embodying the features of my invention. Fig. II is a detail horizontal section on a line corresponding to line 2—2 of Fig. I, of a motor vehicle structure embodying the features of my invention. Parts being shown in full line for convenience and clearness in illustration. Fig. III is a vertical section through the mechanism on a line corresponding to line 3—3 of Fig. II. Fig. IV is a detail section on a line corresponding to line 4—4 of Fig. III. Fig. V is a perspective view of the resilient split ring member 19. Fig. VI is a sectional view corresponding to that of Fig. III, of a modified structure, the intermediate annular member 17 present in Fig. V being omitted.

In the drawings similar reference characters refer to similar parts throughout the several views, and the sectional views are taken looking in the direction of the little arrows at the ends of the section lines.

In the accompanying drawing I have illustrated only such parts of a motor vehicle as are necessary to illustrate my improvements. I have shown only one of the driving or traction wheels, as the other is a duplicate thereof.

The transmission shaft 2 is connected to the driving shaft 1 by means of the beveled gears 3 and 4, gear 4 being secured to the driving shaft 1.

The wheel shown is of the wire type and provided with a flange 6 having a rim 7 thereon forming a hub chambered at its outer end. The hub 5 is provided with a rim flange 8 with which the brake member 9 coacts.

The means for operating the brake member are not illustrated as they form no part of my present invention.

A driving member 10 is secured to the driving shaft by means of the keys 11 and a nut 12. The driving member 10 is provided with a peripheral groove 13, while the rim 7 is provided with an internal peripheral groove 14.

The driving member 10 is provided with a driving lug 15 disposed in its groove, while the hub is provided with a driving lug 16 disposed in its groove.

A ring or annular intermediate member 17 is arranged within the hub and provided with an external driving lug 18 disposed in the groove 14 to coact with the driving lug 16 of the hub, it being otherwise free for independent rotative movement, that is, the hub and member 17 may rotate independently for substantially one complete revolution. Within the member 17 is a resilient split ring or annular member 19 having an internal driving lug 20 at one end, disposed in the groove 13 of the driving member 10, connected with the driving lug 15 thereof.

The member 19 is provided with outwardly projecting lugs 21 at each end which engage with the shoe 22 arranged within the member 17 to coact with the internal driving lug 23 thereof.

For convenience, the lugs 18 and 23 are disposed oppositely and secured by the rivet 24, common to both.

The shoe 22 is provided with a slot 25 with which one of the lugs 21 of the member 19 is engaged, and with a slot 26 adapted to receive the other lug 21.

The slot 26 is of such length as to form a lost motion connection between the end of the resilient member having the driving lug 20 thereon and the shoe. This resilient member 19, owing to its resilient quality, serves as a shock absorber and also serves to prevent rattling or noise.

In the modified structure shown in Fig. VI the intermediate annular member 17 is omitted, and the shoe 22 coacts directly with the driving lug 16 on the driven member 5.

The parts are retained in their assembled relation by means of the retaining plate 27 seated against a shoulder 28 within the hub and retained therein by the hub cap 29.

Both driving wheels being equipped with the mechanism described they are connected to the driving shaft so that in turning or in other cases where one wheel travels faster than the other the driving lug 18 of the gear 17 will move from the driving lugs 16 until it engages the opposite side thereof should the difference in speed be sufficient to cause this and if the difference be great enough the shoe will swing from the driving lug until it engages the opposite side thereof. This is sufficient to accommodate any ordinary variations. When the vehicle returns to its straight away the parts return to their driving.

In the structure illustrated the parts are all simple and economical to produce and very easily assembled.

I have, as stated, especially designed my improved gearing for light motor vehicles of the cycle car type. It is, however, adapted for use in various relations. I have not attempted to illustrate or describe various modifications or adaptations possible as I believe the disclosure made will enable the embodiment of my invention as may be desired.

I desire, however, to be understood as claiming my improvements specifically in the form illustrated, as well as broadly within the scope of the appended claims.

Having thus described my invention, what I claim as new and desire to secure by Letters Patent is:

1. The combination with a driving shaft of a wheel comprising a chambered hub rotatably mounted on said shaft and having an internal peripheral groove therein, a driving member having a peripheral groove therein secured to said shaft, driving lugs disposed in said grooves in said hub and driving member, a ring member provided with internal and external driving lugs, the external driving lug being disposed in said groove in said hub to coact with said driving lug thereof, a resilient split ring member having an external lug at each end and an internal driving lug disposed in said groove in said driving member to coact with the said driving lug thereof, a shoe disposed within said ring member to coact with the internal driving lug thereof, said shoe having slots adaptetd to receive the external lugs on said resilient member, the slot for the lug at the end of the member having the internal driving lug thereon being of such length as to provide a lost motion connection between the parts, said ring members being free for independent rotative movement except as limited by said lugs and shoe, a retaining plate seated in said hub, and a hub cap adapted to clamp said retaining plate in its seat.

2. The combination with a driving shaft of a wheel comprising a chambered hub rotatably mounted on said shaft and having an internal peripheral groove therein, a driving member having a peripheral groove therein, secured to said shaft, driving lugs disposed in said grooves in said hub and driving member, a ring member provided with internal and external driving lugs, the external driving lug being disposed in said groove in said hub to coact with said driving lug thereof, a resilient split ring member having an external lug at each end and an internal driving lug disposed in said groove in said driving member to coact with the said driving lug thereof, a shoe disposed within said ring member to coact with the internal driving lug thereof, said shoe having slots adapted to receive the external lugs on said resilient member, the slot for the lug at the end of the chamber having the internal driving lug thereon being of such length as to provide a lost motion connection between the parts, said ring members being free for independent rotative movement except as limited by said lugs and shoe.

3. The combination with a driving shaft of a wheel comprising a chambered hub rotatably mounted on said shaft, a driving member secured to said shaft, driving lugs on said hub and driving member, a ring member provided with opposed internal and external driving lugs, the external driving lug coacting with said driving lug on said hub, a resilient split ring member having an external lug at each end and an internal driving lug coacting with the said driving lug of said driving member, a shoe disposed with said ring member to coact with the internal driving lug thereof, said shoe having slots adapted to receive the external lugs on said resilient member, the slot for the lug at the end of the resilient member having the internal driving lug thereon being of such length as to provide a lost motion connection between the parts, said ring members being free for independent rotative movement except as limited by said lugs and shoe, and a retaining plate seated in said hub.

4. The combination with a driving shaft of a wheel comprising a chambered hub rotatably mounted on said shaft, a driving member secured to said shaft, driving lugs on said hub and driving member, a ring member provided with opposed internal and external driving lugs, the external driving lug coacting with said driving lug on said hub, a resilient split ring member having an external lug at each end and an internal driving lug coacting with the said driving lug of said driving member, a shoe disposed within said ring member to coact with the internal driving lug thereof, said shoe having slots adapted to receive the external lugs on said resilient member, the slot for the lug at the end of the resilient member having the internal driving lug thereon being of such length as to provide a lost motion connection between the parts, said ring members being free for independent rotative movement except as limited by said lugs and shoe.

5. The combination with a driving shaft of a wheel comprising a chambered hub, rotatably mounted on said shaft and having an internal peripheral groove therein, a driving member having a peripheral groove therein secured to said shaft, driving lugs disposed in said grooves in said hub and driving member, an outer annular member provided with internal and external driving lugs, the external driving lugs being disposed in said groove in said hub rim to coact with said driving lug thereof, an inner annular member having an internal driving lug disposed in said groove in said driving member to coact with said driving lug thereof, and having a driving part coacting with said internal driving lug of said outer annular member, and a retaining plate seated in said hub.

6. The combination with a driving shaft of a wheel comprising a chambered hub rotatably mounted on said shaft and having an internal peripheral groove therein, a driving member having a peripheral groove therein secured to said shaft, driving lugs disposed in said grooves in said hub and driving member, an outer annular member provided with internal and external driving lugs, the external driving lug being disposed in said groove in said hub rim to coact with said driving lug thereof, an inner annular member having an internal driving lug disposed in said groove in said driving member to coact with said driving lug thereof, and having a driving part coacting with said internal driving lug of said outer annular member.

7. The combination with a driving shaft of a wheel comprising a chambered hub rotatably mounted on said shaft, a driving member, driving lugs on said hub and driving member, an outer annular member provided with internal and external driving lugs, the external driving lug coacting with said driving lug on said hub, an inner annular member having an internal driving lug coacting with said driving lug of said driving member, and having a driving part coacting with said internal driving lug of said outer annular member, and a retaining plate seated in said hub.

8. The combination with a driving shaft of a wheel comprising a chambered hub rotatably mounted on said shaft, a driving member, driving lugs on said hub and driving member, an outer annular member provided with internal and external driving lugs, the external driving lug coacting with said driving lug on said hub, an inner annular member having an internal driving lug coacting with said driving lug of said driving member, and having a driving part coacting with said internal driving lug of said outer annular member.

9. The combination with a driving shaft of a wheel comprising a chambered hub rotatably mounted on said shaft, a driving member secured to said shaft, driving lugs on said hub and driving member, an intermediate annular member provided with internal and external driving lugs, the external lugs coacting with said driving lug on said hub, and a resilient member interposed between said annular member and said driving member and adapted to coact with the internal driving lug thereof, said intermediate and resilient members being free for independent rotative movement, except as limited by the engagement of the several driving lugs.

10. The combination of a driving member having a driving lug, a surrounding driven member provided with an internal driving lug, a resilient split ring member having an external lug at each end and an internal driving lug coacting with the said driving lug of said driving member, and a shoe within said driven member to coact with the internal driving lug thereof, said shoe having slots adapted to receive the external lugs on said resilient member, the slot for the lug at the end of the resilient member having the internal driving lug thereon being of such length as to provide a lost motion connection between the parts.

11. The combination of a driving member having a driving lug, a surrounding driven member provided with an internal driving lug, a resilient member interposed between said driving and driven members and having driving lugs coacting with the driving lugs thereof, said resilient member being free for independent rotative movement except as limited by said driving lugs.

12. The combination of a driving member having a driving lug, a surrounding driven member provided with an internal driving lug, a member disposed between said driving and driven member and having driving lugs coacting with the driving lugs thereof, said member being free for independent rotative movement except as limited by said driving lugs.

In witness whereof, I have hereunto set my hand and seal in the presence of two witnesses.

MAURICE E. BLOOD. [L. S.]

Witnesses:
LUELLA GREENFIELD,
ANNIE E. PARRY.

Copies of this patent may be obtained for five cents each, by addressing the "Commissioner of Patents, Washington, D. C."